United States Patent [19]

Martin et al.

[11] 4,443,025
[45] Apr. 17, 1984

[54] FIFTH WHEEL ASSEMBLY

[75] Inventors: Samuel A. Martin, Holland; Fredrick J. Bakker, West Olive; Gerald W. Hungerink; Jack L. Gisinger, both of Holland; James H. Bush, Zeeland, all of Mich.

[73] Assignee: Holland Hitch Company, Holland, Mich.

[21] Appl. No.: 354,240

[22] Filed: Mar. 3, 1982

[51] Int. Cl.³ .............................................. B62D 53/08
[52] U.S. Cl. ..................................... 280/407; 280/433; 280/438 R; 384/428
[58] Field of Search ................... 280/407, 433, 438 R, 280/434, 435, 436, 437, 438 A, 439, 440, 441; 74/105, 106, 520; 384/422, 428, 441, 442, 443, 444

[56] References Cited

U.S. PATENT DOCUMENTS

| 2,533,338 | 12/1950 | Weingarten | 74/520 |
| 2,985,463 | 5/1961 | Geerds | 280/407 |
| 3,606,384 | 9/1971 | Fontaine et al. | 280/407 |
| 3,893,710 | 7/1975 | Madura | 280/407 |

OTHER PUBLICATIONS

5th Wheels U Catalog FW-63, Holland Hitch Co., Holland, MI, ©1959, reprinted 1963.

Primary Examiner—John A. Pekar
Assistant Examiner—D. Lynn Fugate
Attorney, Agent, or Firm—Price, Heneveld, Huizenga & Cooper

[57] ABSTRACT

A fifth wheel assembly for coupling tractor and trailer units includes an improved trunnion bracket, comprising a pair of forged bearing caps having an inverted, U-shaped configuration, with bearing sleeves fixedly mounted therein. In sliding fifth wheel embodiments of the present invention, the bearing caps are mounted on rectangular channels fabricated from two L-shaped channel members with a flat plate attached to the upper edges of the L-shaped channels. An improved plunger is provided for adjustably connecting the trunnioned fifth wheel assembly with a base plate on which slotted racks have been mounted, and comprises a forged, two-prong construction with internal guides which minimizes structural disruption in the channels to provide greater strength. Adjustable stops are mounted on the exterior ends of the plungers, and abut the exterior sides of the racks to accurately maintain the plungers in a locked position. A manual lock release comprises an over-centered lever arm arrangement, which securely retains the plungers in the unlocked position for adjustment.

26 Claims, 16 Drawing Figures

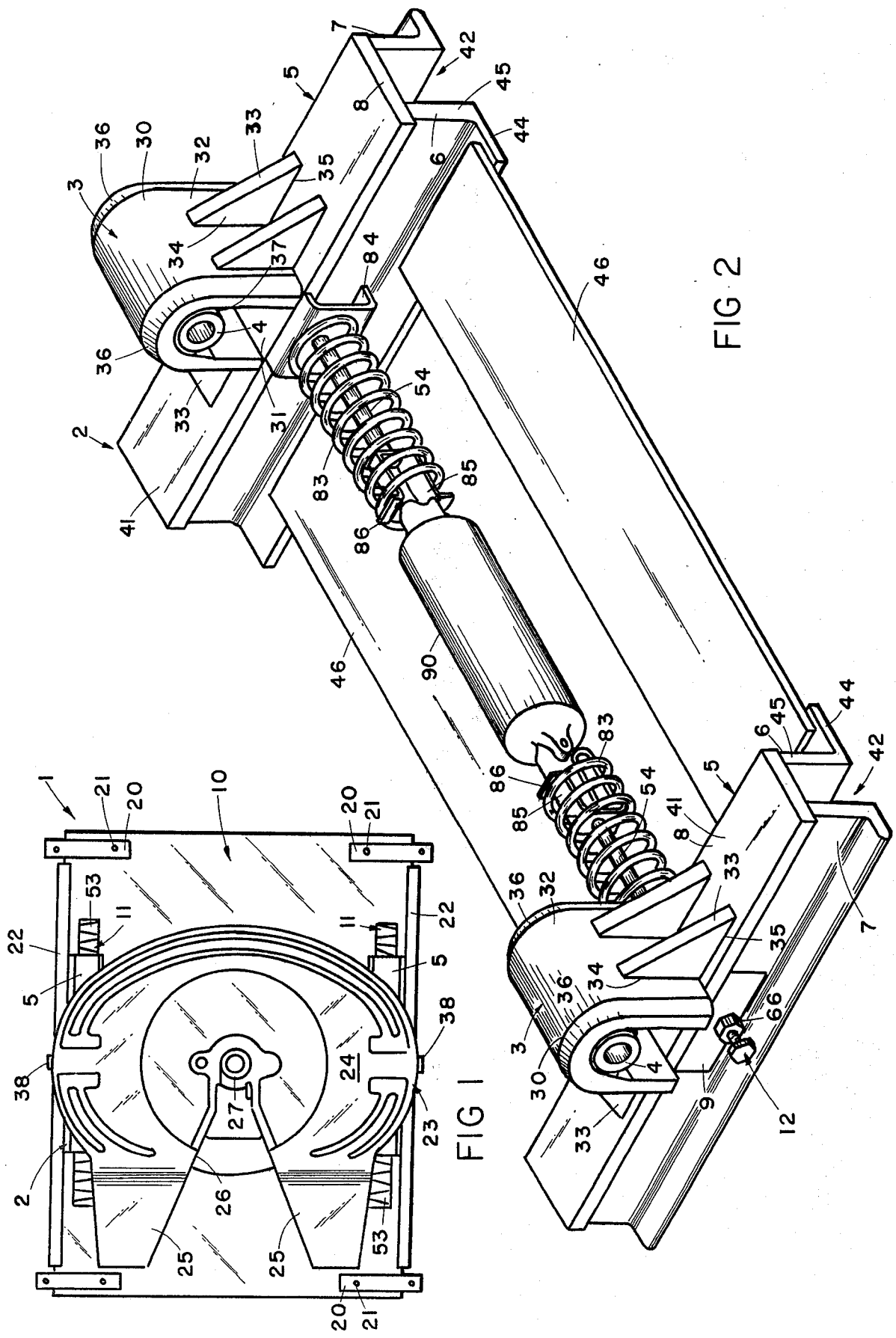

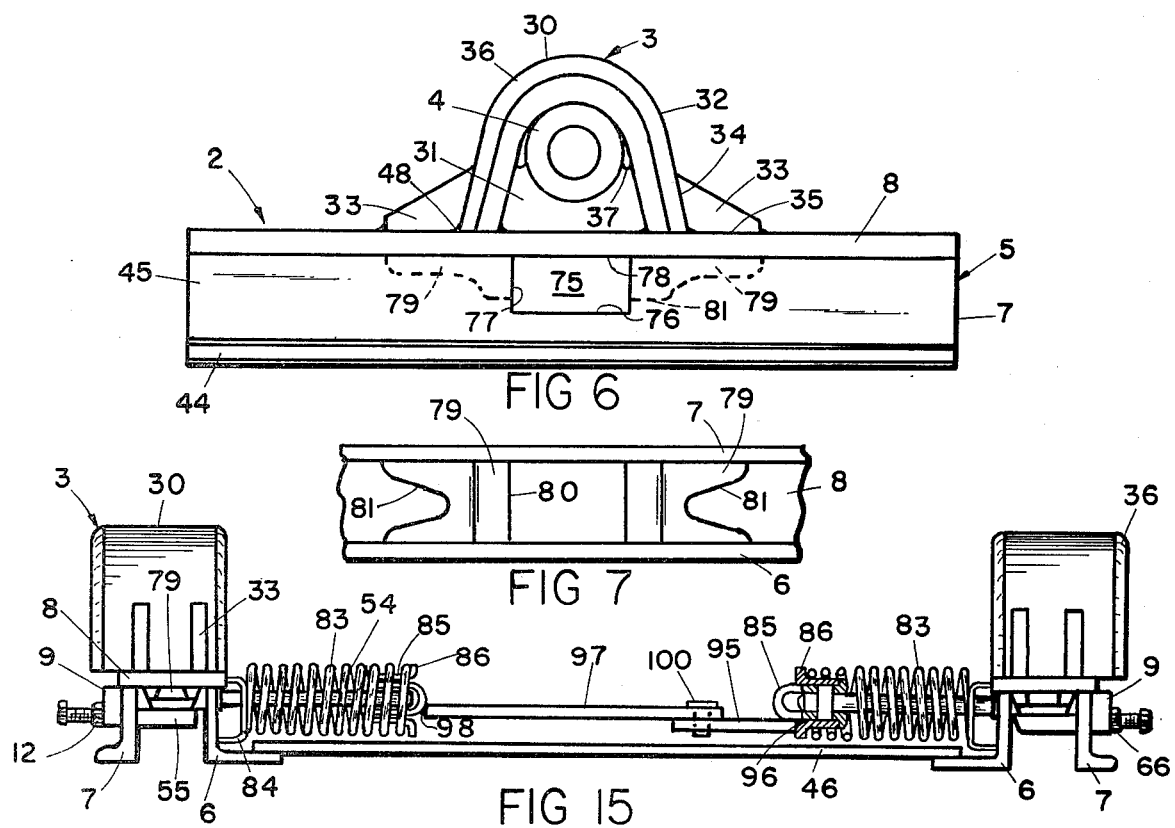
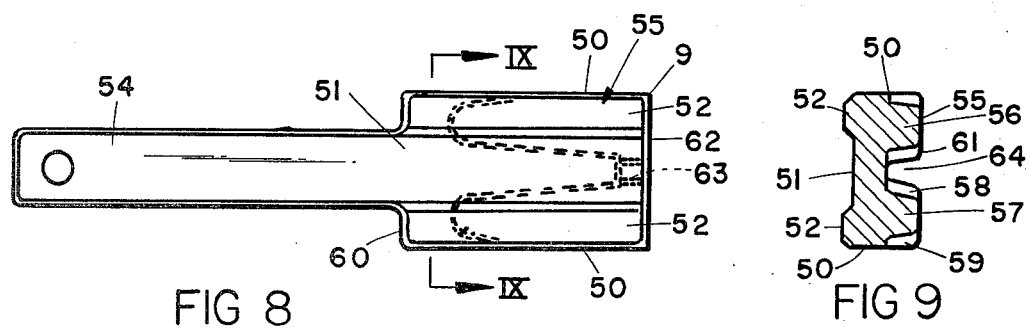
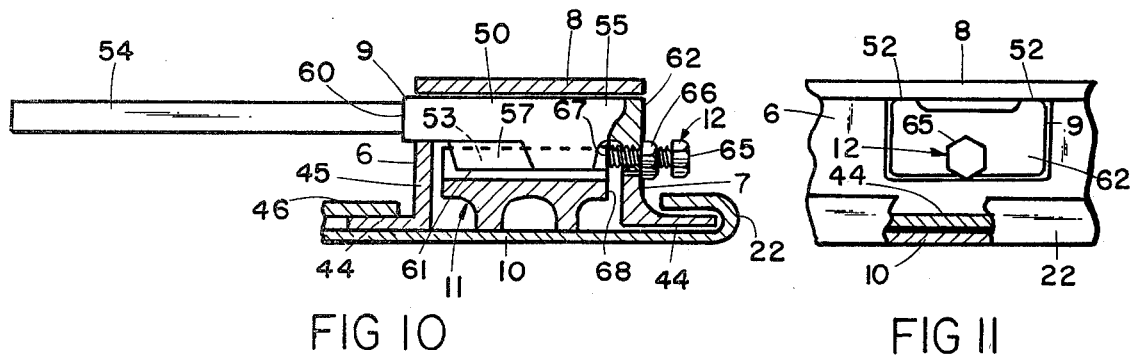

FIFTH WHEEL ASSEMBLY

BACKGROUND OF THE INVENTION

The present invention relates to fifth wheel couplers, and in particular, to an improved trunnion bracket and locking arrangement therefor.

Fifth wheel couplers for connecting a tractor unit to a trailer unit are known in the art, as exemplified by U.S. Pat. No. 2,985,463 to Geerds, assigned to Holland Hitch Company, the assignee of the present application, which patent is hereby incorporated by reference.

In such prior couplers, the trunnion brackets have a totally fabricated construction, and are made from a plurality of specially shaped, stamped panels of steel, which are welded together to form an assembly or weldment. This type of totally fabricated construction requires substantial manufacturing effort, time and expense. The various pieces of the assembly are first stamped out, and then bent or formed into the desired configuration. This type of fabrication process produces a high percentage of scrap and waste, which results in increased material costs. Further, the accumulation of tolerances which is experienced in this type of fabrication process can result in very difficult, time consuming assembly, and requires special welding jigs. The welding process itself creates even further inaccuracies, so that it is very difficult to maintain close tolerances.

Sliding fifth wheel couplers, incorporating a fixed base attached to the tractor and slidably mounted trunnion bracket and locking mechanism, are used to adjustably anchor the fifth wheel to permit variation in weight distribution and length. Heretofore, sliding fifth wheel couplers have used three-pronged locking plungers to connect the trunnion bracket with the slotted racks on the base plate. The three-pronged plunger design is somewhat wide, and therefore requires similarly wide windows in the sides of the trunnion bracket. Also, in prior fifth wheel assemblies, the plungers were slidingly received in inverted U-shaped channels or guides, which further increased the width of the plunger windows. As is apparent to those skilled in the art, it is advantageous to minimize the size of the plunger windows, so as to alleviate disruption of the load carrying portions of the trunnion bracket, and thereby achieve greater strength.

In the Geerds U.S. Pat. No. 2,985,463, the adjustment stops for the lock plungers are mounted on the inside wall of the trunnion bracket, and abut the interior ends of the plungers. Since the trunnion bracket can move slightly on the base plate in a lateral direction, this type of stop adjustment does not positively position the plungers with respect to the racks. Improper plunger adjustment subjects the plungers to extraordinary forces, and can cause wear. Further, the location of the adjustment stops on the interior sidewalls of the trunnion bracket makes it rather inconvenient to adjust the plungers.

Heretofore, manual release embodiments of the sliding fifth wheel arrangement, as illustrated in the Holland Hitch publication noted in the Disclosure Statement, include a pair of handles connected with the exterior ends of the plungers. This type of manual plunger operation requires that the left and right-hand plungers be independently manipulated from the opposite sides of the trunnion bracket, such that adjustment is a two man operation.

SUMMARY OF THE INVENTION

One aspect of the present invention is an improved trunnion bearing comprising a forged bearing cap, having an inverted, U-shaped construction with bearing sleeves mounted therein. The forged bearing cap construction greatly reduces the scrap and waste experienced in prior fabricated bracket designs, thereby lowering material costs. The forged construction also reduces manufacturing costs, provides a very strong, precisely shaped part that is easy to assemble, and can be used interchangeably in many different applications.

Another aspect of the present invention is an improved trunnion bracket for sliding fifth wheel assemblies, comprising a pair of channels constructed of two L-shaped channels, with a flat plate mounted along the upper edges of the channels to further reduce manufacturing costs. Forged bearings are welded to the channel plate to provide a combination forged and fabricated construction.

Yet another aspect of the present invention is an improved locking plunger, having a forged, two-prong configuration which has a more precise shape, and minimizes window width or "span" to improve the strength and rigidity of the trunnion bracket by providing a smoother cross-sectional modulus. The greater precision of the two-prong construction increases trunnion bracket strength without substantially reducing the shear strength of the plungers.

Yet another aspect of the present invention is internally mounted plunger guides to further reduce window span.

Yet another aspect of the present invention are adjustable stops mounted on the exterior ends of the plungers. The stops are positioned to abut the exterior sidewalls of the associated slotted racks, and positively locate the plungers in the locked position. The exterior stop arrangement not only achieves greater accuracy in plunger adjustment, but is also easier and more convenient to manipulate.

Yet another aspect of the present invention is a manual plunger release, which comprises an over-centered lever arm arrangement that securely retains the plungers in the unlocked position during adjustment. The lever arms are interconnected in a fashion that does not require attachment to the base plate, such that the trunnion bracket can be bodily removed from the base plate without disassembling the plunger release mechanism.

The principal objects of the present invention are to provide a fifth wheel assembly which is very strong, efficient in use, economical to manufacture, capable of a long operating life, and particularly well adapted for the proposed use.

These and other features, advantages and objects of the present invention will be further understood and appreciated by those skilled in the art by reference to the following specification, claims and appended drawings.

BRIEF DESCRIPTION OF THE DRAWINGS

FIG. 1 is a top plan view of a fifth wheel assembly embodying the present invention.

FIG. 2 is a perspective view of a trunnion bracket portion of the fifth wheel assembly.

FIG. 6 is a side elevational view of the trunnion bracket, with the plungers removed.

FIG. 7 is a fragmentary, bottom plan view of the trunnion brackets, particularly showing an integral plunger guide.

FIG. 8 is a top plan view of a lock plunger.

FIG. 9 is a cross-sectional view of the lock plunger, taken along the line IX—IX of FIG. 8.

FIG. 10 is a fragmentary, vertical cross-sectional view of the trunnion bracket, with the plunger shown in a locked position within a channel portion of the trunnion bracket.

FIG. 11 is a fragmentary, front elevational view of the assembly shown in FIG. 10, with a portion thereof broken away.

FIG. 15 is an end elevational view of the manual release trunnion bracket shown in FIG. 14.

DETAILED DESCRIPTION OF THE PREFERRED EMBODIMENTS

For purposes of description herein, the terms "upper," "lower," "right," "left," "rear," "front," "vertical," "horizontal" and derivitives thereof shall relate to the invention as oriented in FIGS. 1-4. However, it is to be understood that the invention may assume various alternative orientations, except where expressly specified to the contrary.

Figure 14:
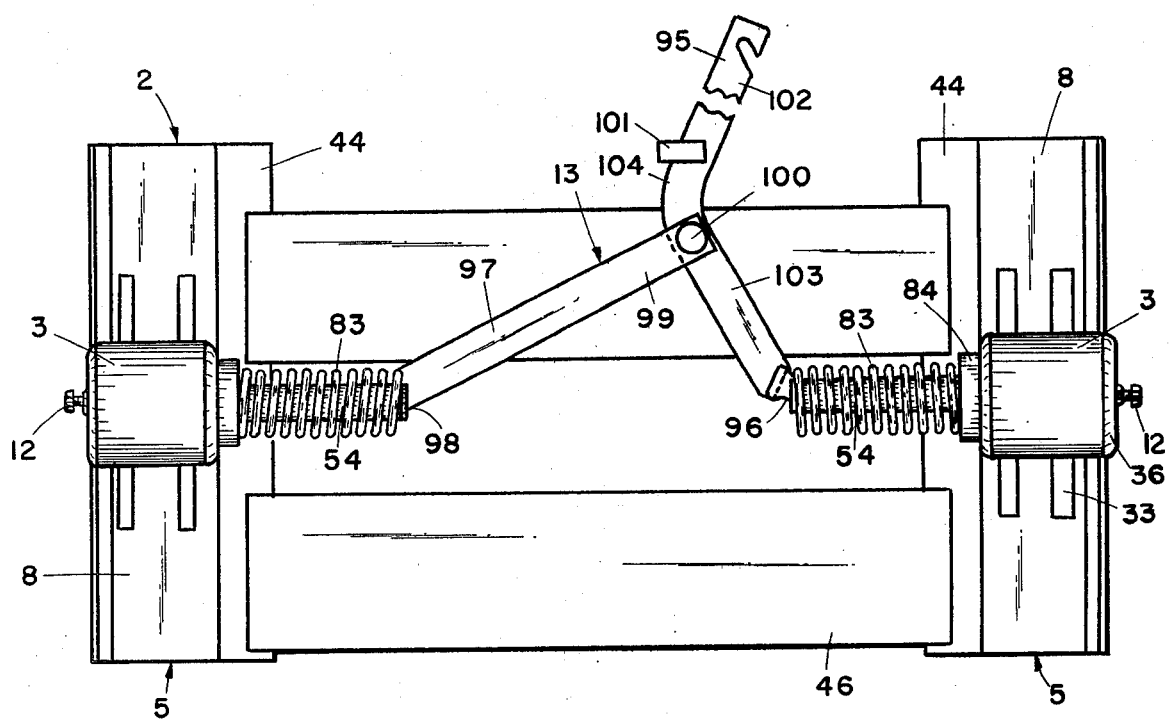
FIG. 14 is a top plan view of a manual release trunnion bracket embodying the present invention, shown in a locked position.
Figure 16:
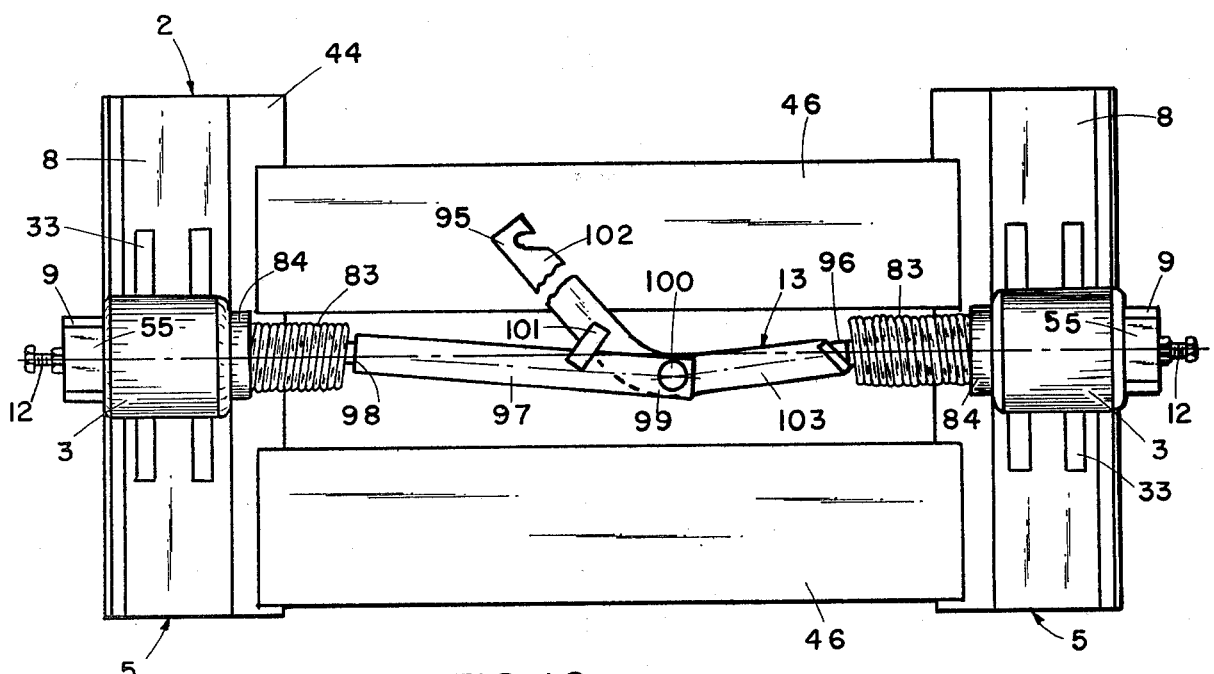
FIG. 16 is a top plan view of the manual release trunnion bracket, shown in an unlocked position.

The reference numeral 1 (FIG. 1) generally designates a fifth wheel assembly for coupling tractor and trailer units embodying the present invention. Fifth wheel assembly 1 includes an improved trunnion bracket 2, comprising a pair of forged bearing caps 3 having an inverted, U-shaped configuration, with bearing sleeves 4 fixedly mounted therein. In the sliding fifth wheel arrangement, bearing caps 3 are mounted on rectangular channels 5 fabricated from two L-shaped channel members 6 and 7 with a flat plate 8 attached along the upper edges thereof. An improved plunger 9 is provided for adjustably connecting the fifth wheel assembly 1 with a base plate 10, having slotted racks 11 attached thereto. Plungers 9 comprise a forged, two-prong construction which minimizes structural disruption in channels 5 to achieve greater strength. Adjustable stops 12 are mounted on the exterior ends of plungers 9, and abut the exterior sides of racks 11 to accurately maintain selected engagement between plungers 9 and racks 11 in the locked position. A manual lock release 13 is illustrated in FIGS. 14-16, and comprises an over-centered lever arm arrangement which securely retains plungers 9 in the unlocked position during adjustment of trunnion bracket 2 on base plate 10.

With reference to FIG. 1, base plate 10 is adapted for connection with the frame portion of a tractor (not shown). In this example, base plate 10 includes tie straps 20 at each corner of base plate 10, with fasteners 21 anchoring the same to the tractor frame. The sides of base plate 10 include upwardly and inwardly rolled edges 22, which form channels or ways in which trunnion bracket 2 is slidingly received. A fifth wheel support or plate 23 is pivotally connected with base plate 10 by trunnion bracket 2, and includes a generally flat center area 24, inclined forks 25, and a V-shaped guide slot 26 which extends to the center of plate area 24, and is adapted to receive and guide the kingpin (not shown) of the trailer unit into a hitch 27.

With reference to FIGS. 2-5, bearing caps 3 have an inverted U-shaped configuration, and are forged steel to provide a one-piece, integral construction which facilitates manufacture and assembly. The forging process produces a more accurately shaped part that is easier to assemble, and alleviates the scrap and waste experienced in welded bearing designs. Bearing caps 3 have an arcuately-shaped top 30, an open bottom 31, and a pair of parallel legs or sidewalls 32, the free ends of which are adapted for connection with fifth wheel assembly 1. Preferably, bearing caps 3 have triangular gussets or reinforcing webs 33. Gussets 33 include vertical legs 34 connected with the exterior sidewalls 32 of bearing cap 3, and horizontal legs 35 adapted for connection with an associated portion of trunnion bracket 2. In this example, each bearing cap 3 includes two reinforcing gussets 33 on each sidewall 32. The opposite end edges 36 of the bearing caps 3 are beveled, and beariing sleeves 4 are positioned within the interior of bearing caps 3 in an aligned relationship. Bearing sleeves 4 preferably have a generally cylindrical shape, with an outside diameter sized for close reception within the interior of the arcuate top portion 30 of bearing cap 3, and are fixedly mounted therein by suitable means such as welds 37 or the like. Pins 38 (FIG. 1) extend through bearing sleeves 4, and are attached to opposite sides of fifth wheel plate 24 to pivotally mount the same on trunnion bracket 2.

The channels 5 of trunnion bracket 2 have a generally rectangular shape with substantially flat upper surfaces 41, and open bottoms which form apertures or slots 42 that define open ended guides which are received over and mate with racks 11 for sliding movement along racks 11. As best illustrated in FIGS. 10 and 11, L-shaped channels 6 and 7 have oppositely oriented horizontal legs 44, and parallel vertical legs 45 which are spaced apart a distance sufficient to receive corresponding rack 11 therebetween. The horizontal leg 44 of exterior channel 7 is received under the upturned edge 22 of base plate 10, and slidingly guides trunnion bracket 2 over base plate 10. The horizontal legs 44 of the two interior channels 6 are interconnected by a pair of transverse cross braces 46 at the forward and rearward sides of trunnion bracket 2.

In the example illustrated in FIG. 2, bearing caps 3 are fixedly attached to the upper surface 41 of channel plate 8 by welds 48 (FIG. 4), or other suitable means, and are laterally aligned and oriented generally perpendicular with the longitudinal axis of channels 5. In the embodiments illustrated in FIGS. 1-11 and 14-16, bearing caps 3 are positioned directly above, and on center with plungers 9. The forged bearing caps 3 in combination with the fabricated trunnion brackets 2 provide an accurately shaped, strong assembly.

Locking plungers 9 (FIGS. 8-11) have a forged, two-prong construction that provides a more precise shape for improved mating with racks 11, and reduced width for greater trunnion bracket strength. Plungers 9 are substantially identical in shape, and have a rectangular outline in plan view, comprising a stem 54 and a head 55 in which a pair of prongs 56 and 57 are formed. Prongs 56 and 57 have opposite sidewalls 58 and 59 which taper inwardly toward the interior side 60 of plunger 9, so as to engage similarly shaped teeth 53 in racks 11 with a wedge locking action. Prong sidewalls 58 and 59 also taper inwardly toward the bottom surface 61 of plunger 9 to facilitate construction by forging. The side faces 50 of plunger heads 55 are flat and mutually parallel. The upper faces 51 of the plunger heads 55 include a pair of upstanding ribs 52 positioned along the sides of upper faces 51. The upper surfaces of ribs 52 are disposed adjacent to the lower surface of channel plate 8 for sliding contact therebetween. The exterior end wall 62 of each plunger head 55 extends downwardly to the bottom surface 61 of prongs 56 and 57, and includes a threaded aperture 63 extending through the center, bottom portion of end wall 62 into the gap or space 64 formed between prongs 56 and 57. In the illustrated example, as best shown in FIGS. 10 and 11, stops 12 comprise threaded fasteners mounted in the end wall apertures 63 of plungers 9, and include an outwardly extending head 65, and a lock nut 66 mounted on the shank of the fastener. The interior end 67 of fastener 12 abuts the exterior surface 68 of the associated rack 11 to positively position prongs 56 and 57 with respect to the mating teeth 53 of rack 11. Typically, it is preferred that the plunger prongs 56 and 57 just mate with the teeth 53 of rack 11, without any longitudinal stress between them to avoid forcing plungers 9 upwardly against plate 8. After proper adjustment has been achieved, lock nut 66 is tightened against the plunger end wall 62, so as to maintain the selected position.

In the illustrated structure, the plunger heads 55 have a width of approximately 2.49 inches, which is in the nature of 1.76 inches less than the prior three-prong plungers discussed above. By reducing the width of the plunger heads 55, the prongs 56 and 57 can be forged more accurately. This results in a better mesh with the teeth 53 of racks 11 to maximize contact area therebetween, minimize mismatch between the teeth, and alleviate stress concentrations. With reference to FIGS. 6 and 10, plungers 9 are slidably mounted in aligned apertures or windows 75 that extend through the vertical legs 45 of trunnion bracket channel members 6 and 7. Windows 75 have a substantially rectangular front elevational shape, and include a horizontal bottom edge 76, and a pair of parallel side edges 77 which extend from bottom edge 76 through the upper edge of channel members 6 and 7, so that the bottom surface of plate 8 forms the upper edge 78 of the windows 75. The two-prong construction of plungers 9 permits reducing the width of window 75, so as to minimize the disruption of the cross-sectional modulus of channels 6 and 7.

Forged gussets 79 (FIGS. 6 and 7) are fixedly mounted between channel members 6 and 7 at the side edges 77 of plunger windows 75 to reinforce channels 5, and to also form guides in which plungers 9 reciprocate. Gussets 79 have flat end faces 80 which extend laterally between the inside surfaces of channel members 6 and 7, and are aligned with the corresponding side edges 77 of plunger windows 75. The lower edges of gusset end faces 80 are positioned slightly above the upper surfaces of rack teeth 53. Gussets 79 taper inwardly at their exterior ends, and have a wedgeshaped aperture therethrough defined by edge 81. Gussets 79 are welded in the interior of channels 5 along the sides, front and rear of the gussets. Curved edge 81 provides additional weld area to the bottom surface of channel plate 8. Gussets 79 form integral, interior guides for plungers 9, and replace the inverted U-shaped channel guides used in prior fifth wheel assemblies. The interior guide construction of the present invention permits reducing the span of windows 75 to a dimension just slightly greater than the width of plunger 9. For example, the width of prior windows is approximately 5 inches, whereas the width of the present window is just slightly greater than 2.49 inches. The combination of the two-prong plunger design and the internal guide construction results in a reduction of the required window span by over fifty percent (50%).

With reference to FIG. 2, plungers 9 are normally biased into the locked position by coil springs 83. The stem portions 54 of plungers 9 extend through the center of coil springs 83, and retainer brackets 84 are mounted on the exterior sides of springs 83 to provide a stationary surface. Another pair of retainer brackets 85 are attached to the interior ends of plunger stems 54, and include outwardly extending wings 86 which engage coil springs 83. Coil springs 83 are pretensed so that plunger stops 12 normally retain plungers 9 in the preselected locked position in racks 11.

Figure 4:
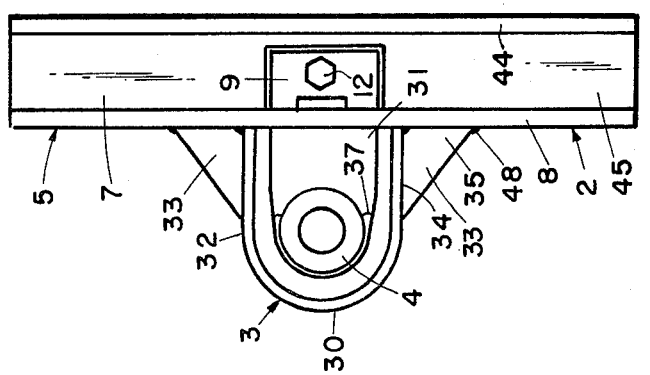
FIG. 4 is a side elevational view of the trunnion bracket.
Figure 3:
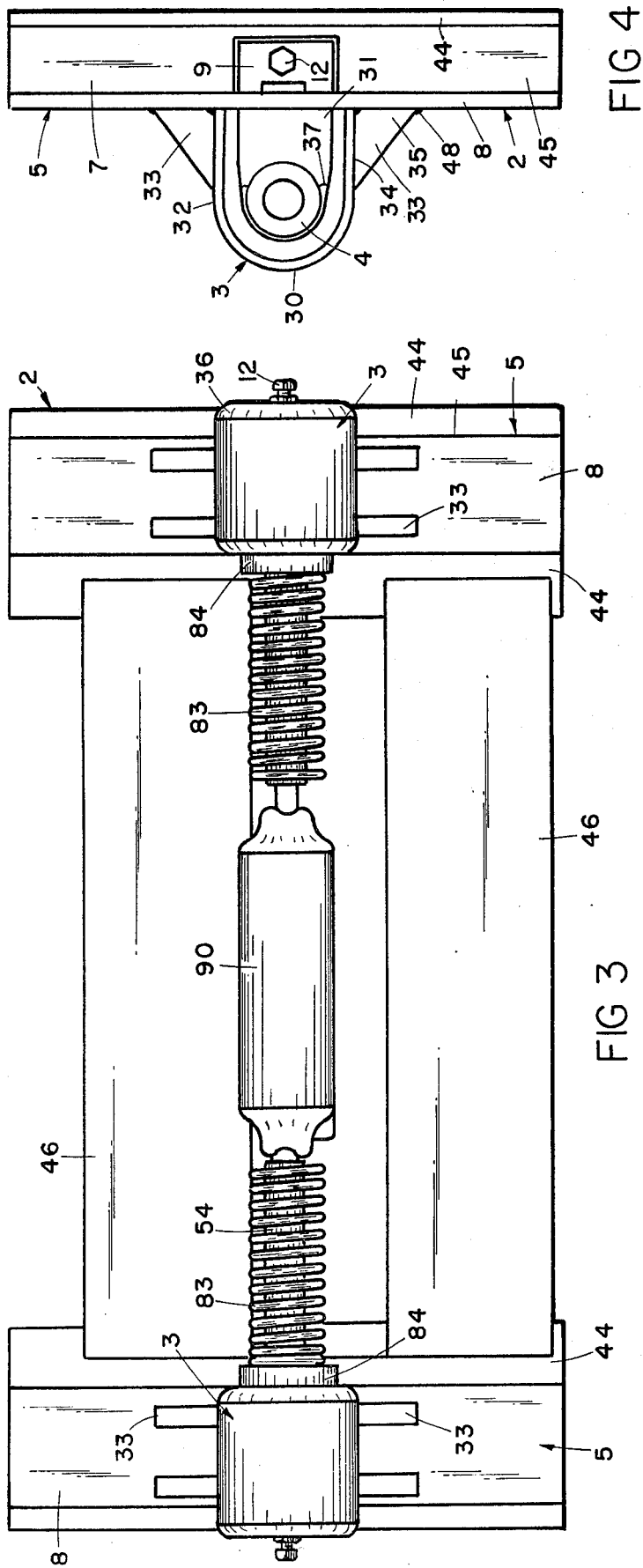
FIG. 3 is a top plan view of the trunnion bracket.
Figure 5:
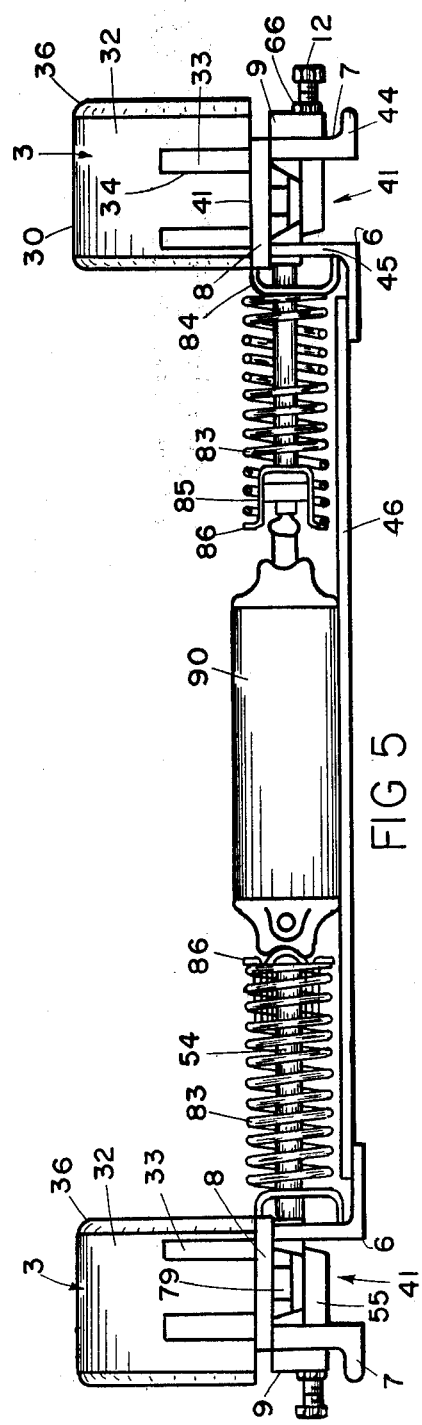
FIG. 5 is an end elevational view of the trunnion bracket.

In the embodiment illustrated in FIGS. 2, 3 and 5, plungers 9 are diverged into the unlocked position by a pneumatic cylinder 90 which is connected between the ends of plunger stems 54. Extension of pneumatic cylinder 90 overcomes the biasing force of coil springs 83 and diverges or laterally moves plungers 9 outwardly through windows 75, so the plunger prongs 56 and 57 disengage the teeth 53 in racks 11. In the unlocked position, trunnion bracket 2 may be moved longitudinally along base plate 10 to adjust vehicle weight distribution. When the pneumatic pressure in cylinder 90 is released, coil springs 83 return plungers 9 to the locked position, thereby securely connecting trunnion bracket 2 with base plate 10.

In the embodiment illustrated in FIGS. 14–16, a manual plunger release mechanism is provided, and comprises a first lever arm 95 having one end 96 pivotally connected with an adjacent one of the plunger stems 54. A second lever arm 97 has one end 98 pivotally connected with the other plunger stem 54, and its opposite end 99 pivotally connected with a medial portion of first lever arm 95 at a pivot joint 100. Selective rotation of lever arm 95 in a counterclockwise direction (as viewed in FIGS. 14 and 16) compresses coil springs 83, and diverges plungers 9 into the unlocked position. A stop 101 is mounted on the upper surface of lever arm 95 and abuts the second lever arm 97 in a slightly over-centered position, as shown in FIG. 16, to retain plungers 9 in the unlocked position to facilitate adjustment of trunnion bracket 2 on base plate 10. In the illustrated example, lever arm 95 is bent at an obtuse angle to provide a somewhat L-shaped plan configuration to facilitate applying force to the outer end 102 of arm lever 95. The second lever arm 97 is generally straight, and positioned on top of the L-shaped lever arm 95, so that the lever arms move in a scissors fashion. Pivot joint 100 is located on the interior leg 103 of L-shaped lever arm 95 at a location adjacent to bend 104, so that lever arms 95 and 97 will assume an over-centered relationship when plunger 9 is in the unlocked position. Since the manual plunger release 13 is free floating, in that it is not physically attached to any portion of the fifth wheel assembly other than the interior ends of the plunger stems 54, the unit can be quickly disassembled, and trunnion bracket 2 can be bodily removed from the base plate 10 without disassembling the plunger release mechanism. Manual plunger release 13 simultaneously locks and unlocks both plungers, and is easy to reach and manipulate from a central location at the rearward side of trunnion bracket 2. This enables fifth wheel assembly 1 to be conveniently adjusted by a single operator.

Figure 12:
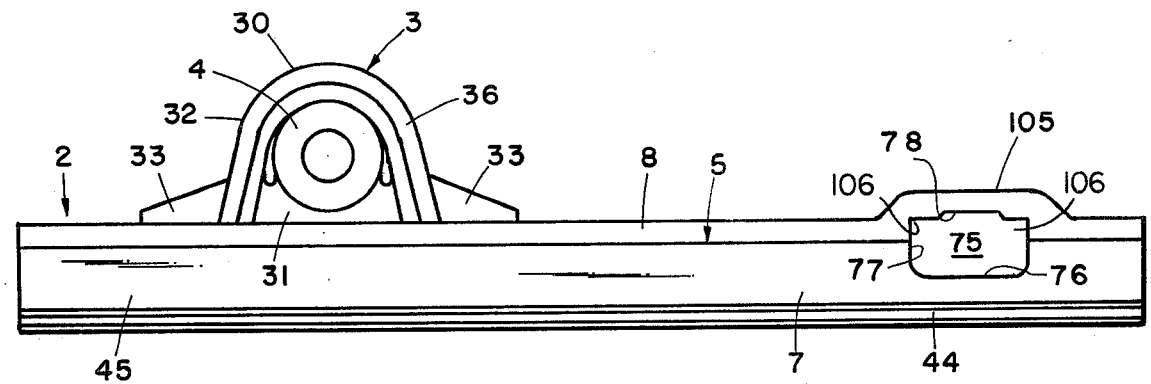
FIG. 12 is a side elevational view of a low profile trunnion bracket embodying the present invention.
Figure 13:
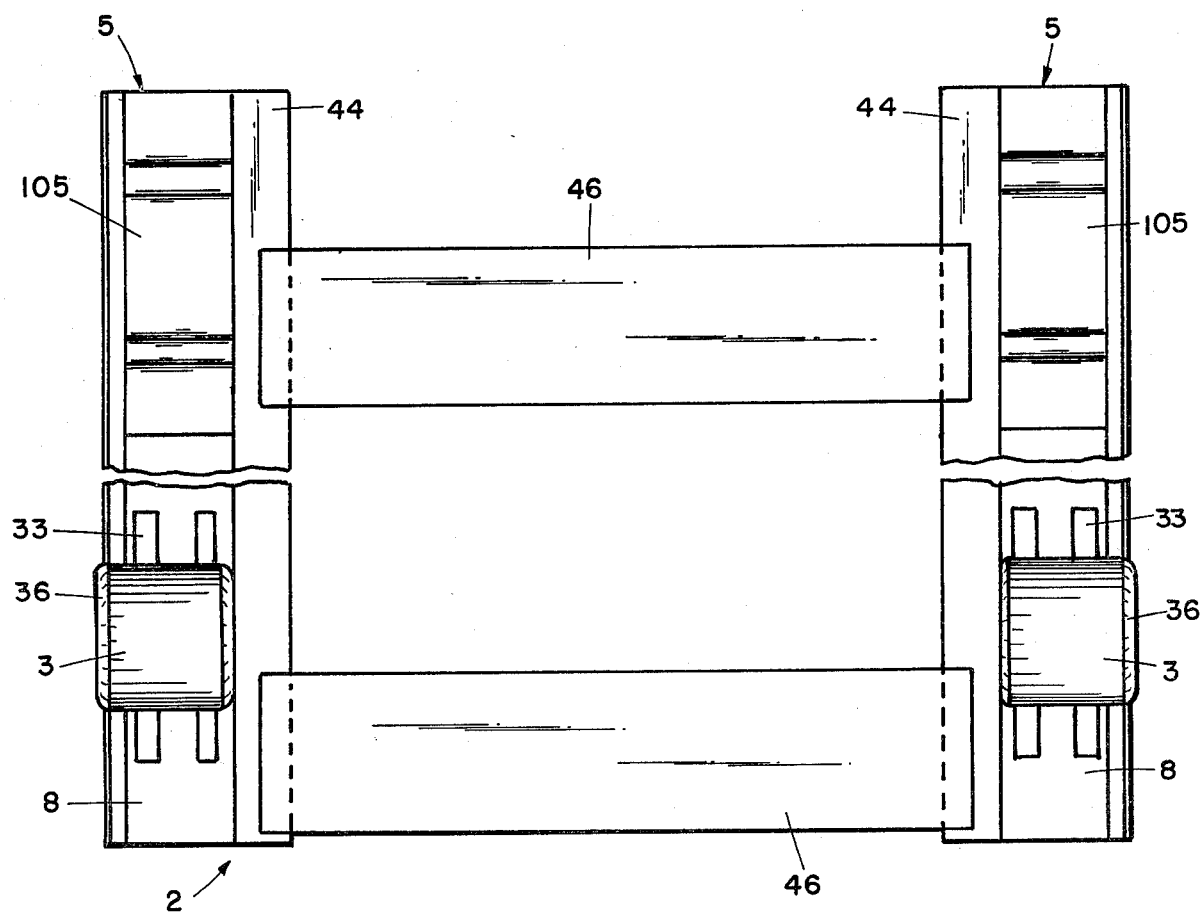
FIG. 13 is a top plan view of the low profile trunnion bracket shown in FIG. 12.

In the low profile embodiment illustrated in FIGS. 12 and 13, the height of channel members 6 and 7 is minimized to lower the central axis of trunnion bearing sleeves 4. In this embodiment, bearing caps 3 are attached directly to the upper surfaces of channel plate 8, and plunger windows 75 are formed through the vertical legs 45 of bracket channels 6 and 7 at a location spaced longitudinally from bearing caps 3. Specially formed plates or caps 105 are positioned over window openings 75, and form a part of the windows, so that plungers 9 can be used interchangeably in all embodiments. Caps 105 have a raised central area, with a downwardly opening, rectangular aperture defined in part by side edges 106, which extend transversely across the entire width of the channels 5. The cap side edges 106 define the sides of the plunger guides, such that gussets 79 are not required in the low profile embodiment illustrated in FIGS. 12-13.

The fifth wheel assembly 1 provides an improved trunnion bracket construction which is easier and more economical to manufacture, without sacrificing strength or reliability. The forged bearing cap design reduces scrap and waste, and provides a more accurately shaped part, which is very strong and easy to assemble. The forged two-prong plunger construction and internal guide design increases the strength of the trunnion bracket 2 by minimizing the structural disruption caused by the plunger windows 75. The more precise shape of the plunger prongs 56 and 57 provides a better fit with the teeth 53 of racks 11 so that the overall shear strength of the plunger lock is not substantially reduced. The new adjustment stops 12 not only positively position the plungers 9 with respect to the racks 11, but are also located on the exterior sides of the trunnion bracket 2 to provide greater convenience in adjustment. The manual plunger release 13 provides an uncomplicated mechanism which is operable by one person at a central location to release both plungers 9 at the same time.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a fifth wheel coupling for selectively interconnecting tractor and trailer units, including a base plate adapted for connection with a tractor unit, and having a pair of slotted, parallel racks mounted thereon in a laterally spaced apart relationship, and a trunnioned fifth wheel assembly adapted for selective connection with a trailer unit, an improved trunnion bracket to pivotally mount said fifth wheel assembly on said base plate, comprising:

a pair of channels having a generally rectangular side elevational shape, and an uncomplicated construction with substantially flat upper surfaces, and open bottoms which form guides that are received over and mate with said racks for sliding movement along said racks;

a pair of forged, high-strength bearing caps, having a generally inverted U-shape, and being fixedly anchored to the flat upper surfaces of said rectangular channels in a substantially perpendicular relationship with said rectangular channels;

a pair of separate bearing sleeves positioned within said bearing caps, and being fixedly anchored therein; and means for selectively connecting said rectangular channels with said racks, whereby said improved trunnion bracket is strong, and can be readily manufactured.

2. A fifth wheel coupling as set forth in claim 1, wherein said channels each comprise:

a pair of L-shaped channel members spaced a predetermined distance apart, having vertical flanges which are disposed in a mutually parallel relationship, and horizontal flanges which are disposed at the bottom of the channel and extend in opposite directions;

a substantially flat plate fixedly connected with upper edges of said vertical flanges.

3. A fifth wheel coupling as set forth in claim 2, wherein:

said vertical flanges include laterally aligned apertures which extend through the upper edges of said vertical flanges to form windows in which a portion of said connecting means is received.

4. A fifth wheel coupling as set forth in claim 3, wherein said connecting means includes:

a pair of locking plungers slidingly received in said windows, and having a configuration which mates with said racks.

5. A fifth wheel coupling as set forth in claim 4, wherein:

said bearing caps have an arcuately-shaped top, an open bottom, and a pair of parallel sidewalls with free ends connected with said channel plate.

6. A fifth wheel coupling as set forth in claim 5, including:

reinforcing webs connected with said cap sidewalls and said channel plate.

7. A fifth wheel coupling as set forth in claim 6, wherein:

said bearing sleeves have a generally cylindrical shape with an outside diameter sized for close reception within the arcuate tops of said bearing caps.

8. In a fifth wheel coupling for selectively interconnecting tractor and trailer units, including a base plate adapted for connection with a tractor unit, and having a pair of slotted, parallel racks mounted thereon in a laterally spaced apart relationship; a trunnioned fifth wheel assembly having a pair of guides received over said racks for sliding movement therealong; a pair of wedge-shaped locking plungers slidably mounted in aligned windows disposed in opposite sides of said guides; and means for selectively engaging said locking plungers with said racks to adjustably anchor said fifth wheel assembly on said base plate, the improvement comprising:

said locking plungers have a forged, high-strength two prong configuration with reduced width for greater strength;

said guides including opposite, generally vertically oriented sidewall plates with apertures therethrough which are shaped for close, sliding reception of said plungers therein to define said windows, which are flush with guides, and have reduced window width for minimal structural disruption in said guides and improved rigidity; and first and second gussets fixedly mounted between the sidewall plates of said guides, and having end faces extending between and aligned with each pair of said windows to define interior guides in which said plungers are reciprocated.

9. A fifth wheel coupling as set forth in claim 8, wherein:

said plungers have exterior ends;

said engaging means converge said plungers into a locked position; and including stops connected with the exterior ends of said plungers, and positioned to abut said racks in the locked position to positively maintain said plungers in a preselected, engaged relationship with said racks.

10. A fifth wheel coupling as set forth in claim 9, wherein:

said stops are adjustably mounted in said plungers.

11. A fifth wheel coupling as set forth in claim 10, wherein:

said stops comprise studs threadedly mounted in the exterior ends of said plungers for adjusting said stops in substantially infinitesimally small increments.

12. In a fifth wheel coupling for selectively interconnecting tractor and trailer units, including a base plate adapted for connection with a tractor unit, and having a pair of slotted, parallel racks mounted thereon in a laterally spaced apart relationship; a trunnioned fifth wheel assembly having a pair of guides received over said racks for sliding movement therealong; a pair of wedge-shaped locking plungers slidably mounted in aligned windows disposed in opposite sides of said guides; and means for selectively engaging said locking plungers with said racks to adjustably anchor said fifth wheel assembly on said base plate, the improvement of an internal plunger guide arrangement, wherein:

said guides include opposite, generally vertically oriented sidewall plates with apertures therethrough which are shaped for close, sliding reception of said plungers therein to define said windows which are flush-formed in said guides; and including first and second gussets fixedly mounted within the sidewall plates of each of said rack guides, and having end faces extending between and aligned with each pair of said windows to define channels in which said plungers are reciprocated.

13. In a fifth wheel coupling as set forth in claim 12, wherein:

said gusset end faces have a lower edge positioned slightly above upstanding teeth in said racks.

14. In a fifth wheel coupling as set forth in claim 13, wherein:

said gussets have sides and ends welded to said rack guides for reinforcing said rack guides at said windows.

15. In a fifth wheel coupling for selectively interconnecting tractor and trailer units, including a base plate adapted for connection with a tractor unit, having a pair of slotted, parallel racks mounted thereon in a laterally spaced apart relationship; a trunnioned fifth wheel assembly having a pair of guides received over said racks for sliding movement therealong; a pair of wedge-shaped locking plungers slidably mounted in aligned windows disposed is opposite sides of said guides; and means for selectively engaging said locking plungers with said racks to adjustably anchor said fifth wheel assembly on said base plate, the improvement comprising:

stops connected with said plungers, and positioned to abut said racks to positively maintain said plungers in a preselected locked position with respect to said racks.

16. A fifth wheel coupling as set forth in claim 15, wherein:

said engaging means diverges said plungers into an unlocked position, and coverges said plungers into the locked position;

said plungers have exterior ends;

said racks have exterior sides;

said stops are connected with the exterior ends of said plungers, and are positioned to abut the exterior sides of said racks in the locked position.

17. A fifth wheel coupling as set forth in claim 16, including:

means for adjusting the position of said stops with respect to said racks.

18. A fifth wheel coupling as set forth in claim 17, wherein:

said adjusting means is positioned on exterior sides of said guides to facilitate manipulation.

19. A fifth wheel coupling as set forth in claim 18, wherein:

said stops and said adjusting means comprise studs threadedly mounted in said plunger exterior ends for adjusting said stops in infinitesimally small increments.

20. A fifth wheel coupling as set forth in claim 19, wherein:

said studs include lock nuts mounted thereon to selectively retain said studs in place.

21. A fifth wheel coupling as set forth in claim 20, wherein:

said studs include heads projecting from the exterior ends of said plungers to facilitate rotation of said studs.

22. In a sliding fifth wheel coupling for selectively interconnecting tractor and trailer units, including a base plate adapted for connection with a tractor unit, and having a pair of slotted, parallel racks mounted thereon in a laterally spaced apart relationship; a trunnioned fifth wheel assembly slidingly connected with said base plate; a pair a wedge-shaped locking plungers slidably mounted in aligned windows disposed in opposite sides of said trunnioned fifth wheel assembly; and means for selectively engaging said locking plungers with said racks to adjustably anchor said trunnioned fifth wheel assembly on said base plate, the improvement wherein:

said trunnioned fifth wheel assembly comprises a pair of generally rectangular channels having substantially flat upper surfaces, and open bottoms which form guides that are received over and mate with said racks for sliding movement along said racks; a pair of forged bearing caps, having a generally inverted U-shape, and being fixedly anchored to the upper surfaces of said channels in a substantially perpendicular relationship with said channels; a pair of bearing sleeves positioned transversely within said bearing caps, and being fixedly anchored therein;

said locking plungers have a forged, two-prong configuration with reduced width for greater strength;

and said windows are shaped for close, sliding reception of said plungers therein to reduce window width and minimize structural disruption in said guides for improved rigidity;

said trunnioned fifth wheel assembly further comprises first and second gussets fixedly mounted within each of said guides, and having end faces extending between and aligned with each pair of said windows to define internal guides in which said plungers are reciprocated; and said windows and internal plunger guides have a width slightly greater than the width of said plungers;

stops connected with said plungers, and positioned to abut said racks to positively maintain said plungers in a preselected locked position with respect to said racks; and said plunger engaging means comprises means for resiliently biasing said plungers into a converged, normally locked position with said racks; a first lever arm having a first end pivotally connected with one of said plungers, and a second end adapted for applying a lateral release force thereto; a second lever arm having a first end pivotally connected with the other one of said plungers, and a second end pivotally connected with a medial portion of said first lever arm, whereby selective rotation of said first lever arm diverges said plungers into an unlocked position.

23. A fifth wheel coupling as set forth in claim 22, wherein:
said bearing sleeves have a generally cylindrical shape with an outside diameter sized for close reception within said bearing caps.

24. A fifth wheel coupling as set forth in claim 22, wherein:
said stops comprise studs threadedly mounted in exterior ends of said plungers for adjusting said stops in infinitesimally small increments.

25. A fifth wheel coupling as set forth in claim 22, wherein:
said second lever arm second end is connected with said first lever arm at a point thereon which causes said arms to assume an over-centered relationship in the unlocked plunger position; and including
a stop mounted on one of said lever arms, and positioned to abut the other of said lever arms in the unlocked plunger position to retain the same therein.

26. In a fifth wheel coupling for selectively interconnecting a tractor unit and a trailer unit including a base plate adapted for connection with a tractor unit, and a trunnioned fifth wheel assembly adapted for selective connection with the trailer unit, an improved trunnion bearing for pivotally mounting said fifth wheel assembly on said base plate, comprising:
a forged, high-strength bearing cap, having a generally inverted U-shape, and being fixedly anchored with respect to said base plate;
a separate bearing sleeve positioned transversely within said bearing cap, and fixedly anchored therein; and
a pivot pin connected with said fifth wheel assembly and closely received in said bearing sleeve for rotation therein, whereby said improved trunnion bracket is strong, and can be readily manufactured.

* * * * *

UNITED STATES PATENT AND TRADEMARK OFFICE
CERTIFICATE OF CORRECTION

PATENT NO. : 4,443,025

DATED : April 17, 1984

INVENTOR(S) : Samuel A. Martin et al

It is certified that error appears in the above-identified patent and that said Letters Patent is hereby corrected as shown below:

Column 4, line 27:
"beariing" should be --bearing--;

Column 9, Claim 8, line 1:
before "guides" insert --said--;

Column 9, Claim 15, line 68:
"is" should be --in--;

Column 10, Claim 22, line 48:
"pair a" should be --pair of--

Signed and Sealed this

Thirtieth Day of October 1984

[SEAL]

Attest:

Attesting Officer

GERALD J. MOSSINGHOFF

Commissioner of Patents and Trademarks